US011199870B2

(12) United States Patent
Engler et al.

(10) Patent No.: US 11,199,870 B2
(45) Date of Patent: *Dec. 14, 2021

(54) CLOCK COMPARATOR SIGN CONTROL

(71) Applicant: INTERNATIONAL BUSINESS MACHINES CORPORATION, Armonk, NY (US)

(72) Inventors: Eberhard Engler, Tuebingen (DE); Dan F. Greiner, San Jose, CA (US); Michel H. T. Hack, Cortlandt Manor, NY (US); Timothy J. Slegel, Staatsburg, NY (US); Joachim von Buttlar, Schoenaich (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 219 days.

This patent is subject to a terminal disclaimer.

(21) Appl. No.: 16/544,063

(22) Filed: Aug. 19, 2019

(65) Prior Publication Data

US 2019/0377379 A1     Dec. 12, 2019

Related U.S. Application Data

(63) Continuation of application No. 15/409,601, filed on Jan. 19, 2017, now Pat. No. 10,423,191.

(51) Int. Cl.
```
G06F 1/14       (2006.01)
G06F 9/30       (2018.01)
G06F 9/48       (2006.01)
G06F 8/70       (2018.01)
```
(52) U.S. Cl.
CPC .............. *G06F 1/14* (2013.01); *G06F 9/3001* (2013.01); *G06F 9/4812* (2013.01); *G06F 8/78* (2013.01)

(58) Field of Classification Search
None
See application file for complete search history.

(56) References Cited

U.S. PATENT DOCUMENTS

| 7,774,455 B1 | 8/2010 | Tock et al. |
| 8,289,074 B2 | 10/2012 | Yamamoto et al. |
| 9,600,292 B2 | 3/2017 | Gschwind |

(Continued)

FOREIGN PATENT DOCUMENTS

| EP | 0011699 B1 | 4/1983 |
| JP | H0440552 A | 2/1992 |

(Continued)

OTHER PUBLICATIONS

EPO Communication Pursuant to Article 94(3) EPC, Application No. 17, 825 249.0-1203, dated Apr. 13. 2021, pp. 1-8.

(Continued)

*Primary Examiner* — Paul Yen
(74) *Attorney, Agent, or Firm* — Steven Chiu, Esq.; Blanche E. Schiller, Esq.; Heslin Rothenberg Farley & Mesiti P.C.

(57) ABSTRACT

A clock comparator sign control is used in a compare operation. A clock comparator sign control that determines whether unsigned arithmetic or signed arithmetic is to be used in a comparing operation is obtained. The clock comparator sign control is then used in a comparison of a value of a clock comparator and at least a portion of a value of a time-of-day clock to determine whether a selected action is to be recognized.

20 Claims, 6 Drawing Sheets

(56) References Cited

U.S. PATENT DOCUMENTS

| | | |
|---|---|---|
| 9,921,849 B2 | 3/2018 | Bradbury et al. |
| 2003/0101365 A1 | 5/2003 | Elko et al. |
| 2006/0117316 A1 | 6/2006 | Cismas et al. |
| 2007/0061605 A1 | 3/2007 | Engler et al. |
| 2015/0277923 A1 | 10/2015 | Bradbury et al. |

FOREIGN PATENT DOCUMENTS

| | | |
|---|---|---|
| JP | 2015143993 A | 8/2015 |
| WO | WO9834170 A1 | 8/1998 |

OTHER PUBLICATIONS

IBM, "z/ Architecture—Principles of Operation," SA22-7832-10, Mar. 2015, pp. 1-1732.
IBM, "PowerISA—V2.07B," Apr. 2015, pp. 1-1527.
Decision to Grant a Patent for Japanese Patent Application No. JP2019536914, Jun. 3, 2021, pp. 1-2 (Original Document), pp. 3-5 (Machine Translation).
India Examination Report Under Sections 12 & 13 of the Patents Act, Application No. 201947026602, May 12, 2021, pp. 1-7.

CLOCK COMPARATOR SIGN CONTROL

This application is a continuation of co-pending U.S. patent application Ser. No. 15/409,601, filed Jan. 19, 2017, entitled "CLOCK COMPARATOR SIGN CONTROL," which is hereby incorporated herein by reference in its entirety.

BACKGROUND

One or more aspects relate, in general, to processing within a computing environment, and in particular, to facilitating such processing.

A computing environment often provides timing facilities that are used to control processing within the environment. As one example, mainframe processors offered by International Business Machines Corporation, Armonk, N.Y., provide a timing facility that includes a variety of hardware timing registers, instructions for setting and inspecting the timing registers, and interruption mechanisms for when the value in a timing register reaches a threshold value.

Example registers that may be provided are a time-of-day (TOD) clock register and a clock comparator register. The clock comparator register is used to determine whether an action, such as an interruption, is to be taken based on a time-of-day clock register reaching a particular value.

SUMMARY

Shortcomings of the prior art are overcome and additional advantages are provided through the provision of a computer program product for facilitating processing within a computing environment. The computer program product comprises a storage medium readable by a processing circuit and storing instructions to perform a method. The method includes obtaining a clock comparator sign control to be used to determine whether unsigned arithmetic or signed arithmetic is to be used in a comparing operation; and using the clock comparator sign control in a comparison of a value of a clock comparator and at least a portion of a value of a time-of-day clock to determine whether a selected action is to be recognized.

The using the clock comparator sign control in the comparison results in correctly indicating whether the selected action is to be recognized, regardless of whether the time-of-day clock has overflowed.

In one embodiment, based on the clock comparator sign control being set to a first value, unsigned binary arithmetic is to be used in the comparison, the first value being a default value to provide compatibility for operating systems at various levels. Further, in one embodiment, based on the clock comparator sign control being set to a second value, signed binary arithmetic is to be used in the comparison.

As an example, the selected action is an interruption of processing within the computing environment.

Moreover, in one example, the clock comparator is one size and the time-of-day clock is an extended time-of-day clock of a different size than the clock comparator, and wherein the time-of-day clock may overflow.

As examples, the clock comparator sign control is located in a control register, the clock comparator is implemented as a clock comparator register, and/or the time-of-day clock is implemented as a time-of-day clock register.

Further, in one aspect, the clock comparator sign control is used to specify what constitutes a discontinuity in a compared portion of the time-of-day clock.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with an aspect of the present invention, a timing facility is enhanced to facilitate processing within a computing environment. For instance, a clock comparator sign control is provided, which is used in comparison processing of timing information within the computing environment. This sign control is provided to facilitate comparison of a clock comparator of one size (e.g., 64 bits) with at least a portion of an extended-format time-of-day (TOD) clock of a different size (e.g., 104 bits) to correctly indicate actions to be recognized (and possibly taken), such as clock comparator interrupts, regardless of whether the TOD clock overflows.

One embodiment of a computing environment to incorporate and use one or more aspects of the present invention is described with reference to FIG. 1A. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

Figure 1A:
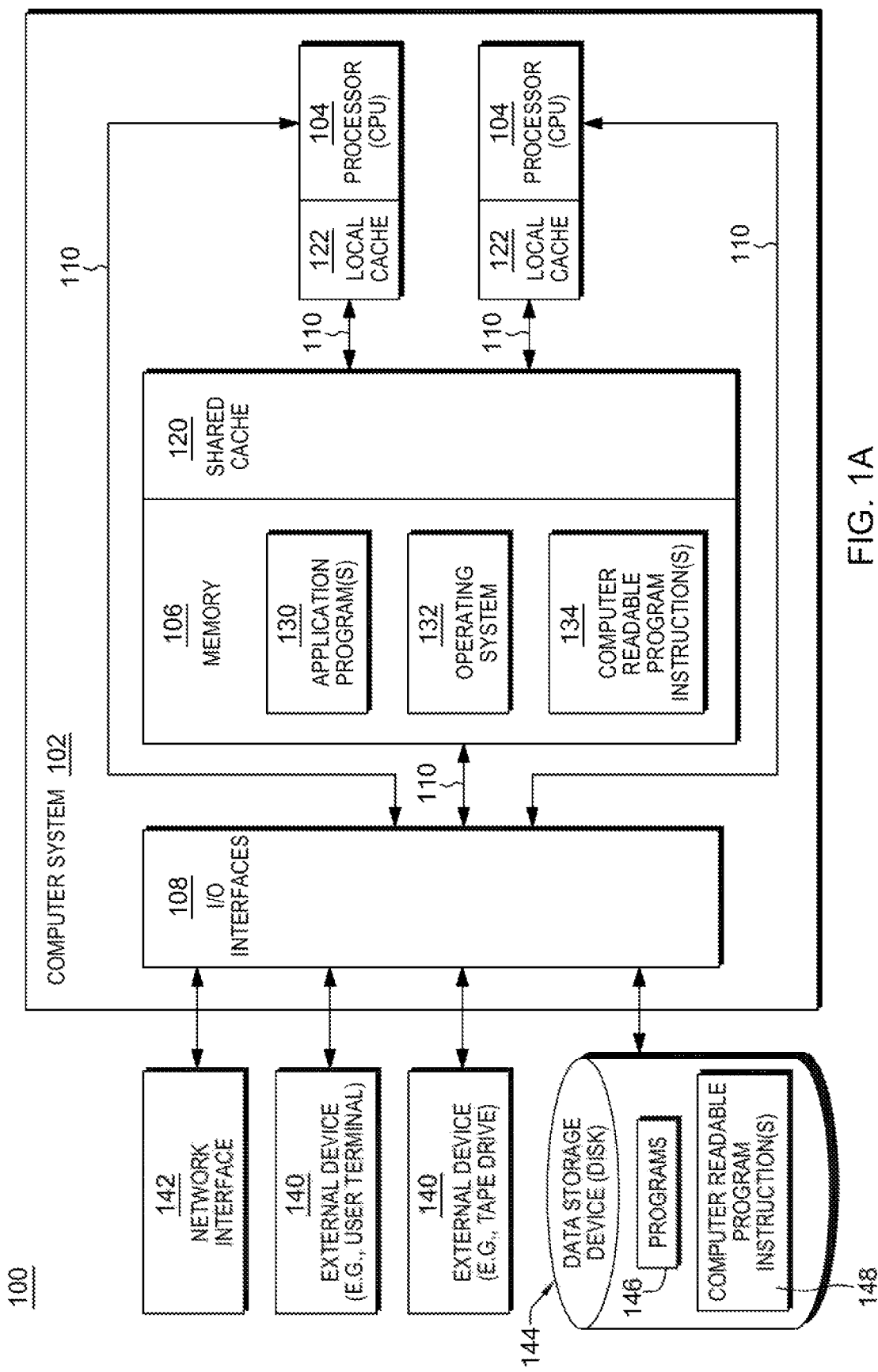
FIG. 1A depicts one example of a computing environment to incorporate and use one or more aspects of the present invention.

As shown in FIG. 1A, a computing environment 100 includes, for instance, a computer system 102, shown, e.g., in the form of a general-purpose computing device. Computer system 102 may include, but is not limited to, one or more processors or processing units 104 (e.g., central processing units (CPUs)), a memory 106 (referred to as main memory or storage, as examples), and one or more input/output interfaces 108, coupled to one another via one or more buses and/or other connections 110.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 120, such as a shared cache, which may be coupled to local caches 122 of processors 104. Further, memory 106 may include one or more programs or applications 130, an operating system 132, and one or more computer readable program instructions 134. Computer readable program instructions 134 may be configured to carry out functions of embodiments of aspects of the invention.

Computer system 102 may also communicate via, e.g., I/O interfaces 108 with one or more external devices 140, one or more network interfaces 142, and/or one or more data storage devices 144. Example external devices include a user terminal, a tape drive, a pointing device, a display, etc. Network interface 142 enables computer system 102 to communicate with one or more networks, such as a local area network (LAN), a general wide area network (WAN), and/or a public network (e.g., the Internet), providing communication with other computing devices or systems.

Data storage device 144 (e.g., a disk) may store one or more programs 146, one or more computer readable program instructions 148, and/or data, etc. The computer readable program instructions may be configured to carry out functions of embodiments of aspects of the invention.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
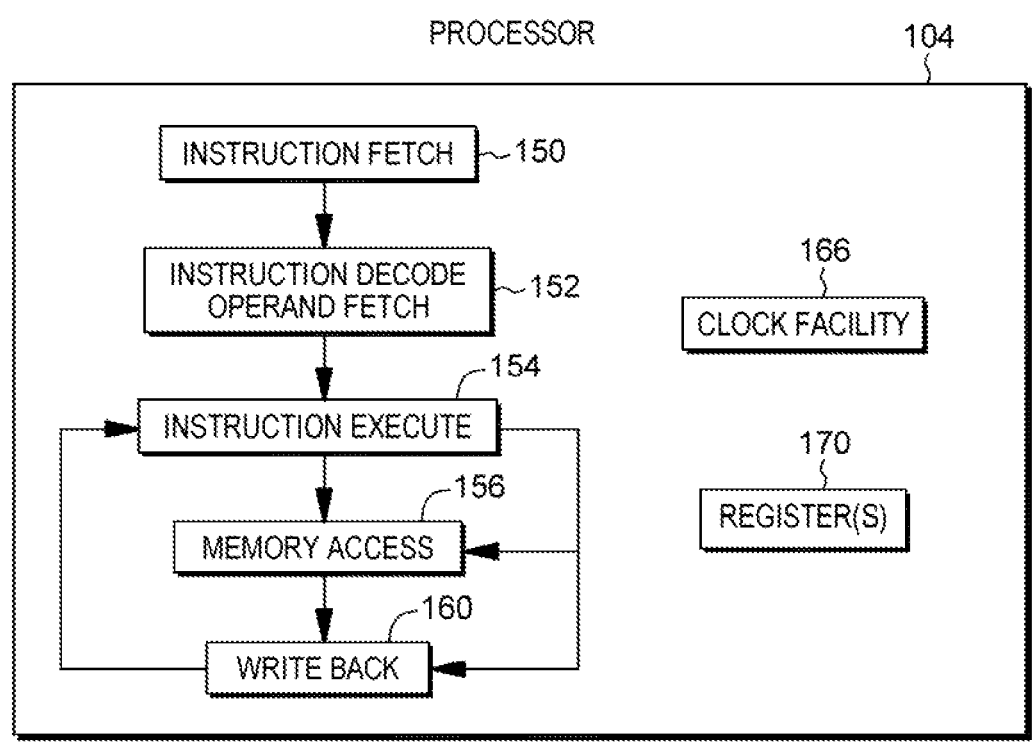
FIG. 1B depicts further details of a processor of FIG. 1A, in accordance with an aspect of the present invention.

Further details regarding one example of processor 104 are described with reference to FIG. 1B. Processor 104 includes a plurality of functional components used to execute instructions. These functional components include, for instance, an instruction fetch component 150 to fetch instructions to be executed; an instruction decode unit 152 to decode the fetched instructions and to obtain operands of the decoded instructions; instruction execution components 154 to execute the decoded instructions; a memory access component 156 to access memory for instruction execution, if necessary; and a write back component 160 to provide the results of the executed instructions. One or more of these components may, in accordance with an aspect of the present invention, be used to execute one or more instructions of a clock facility 166, as described further below.

Processor 104 also includes, in one embodiment, one or more registers 170 to be used by one or more of the functional components.

Figure 2A:
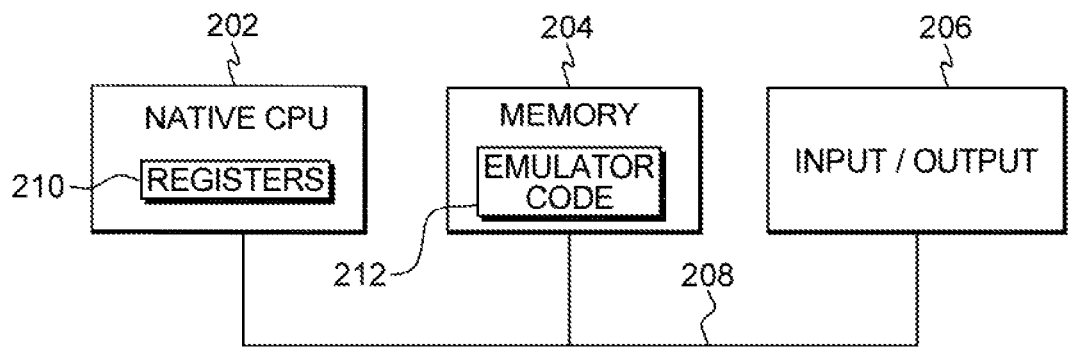
FIG. 2A depicts another example of a computing environment to incorporate and use one or more aspects of the present invention.

Another embodiment of a computing environment to incorporate and use one or more aspects is described with reference to FIG. 2A. In this example, a computing environment 200 includes, for instance, a native central processing unit (CPU) 202, a memory 204, and one or more input/output devices and/or interfaces 206 coupled to one another via, for example, one or more buses 208 and/or other connections. As examples, computing environment 200 may include a PowerPC processor or a pSeries server offered by International Business Machines Corporation, Armonk, N.Y.; and/or other machines based on architectures offered by International Business Machines Corporation or other companies.

Native central processing unit 202 includes one or more native registers 210, such as one or more general purpose registers and/or one or more special purpose registers used during processing within the environment. These registers include information that represents the state of the environment at any particular point in time.

Moreover, native central processing unit 202 executes instructions and code that are stored in memory 204. In one particular example, the central processing unit executes emulator code 212 stored in memory 204. This code enables the computing environment configured in one architecture to emulate another architecture. For instance, emulator code 212 allows machines based on architectures other than the z/Architecture, such as PowerPC processors, pSeries servers, or other servers or processors, to emulate the z/Architecture and to execute software and instructions developed based on the z/Architecture.

Figure 2B:
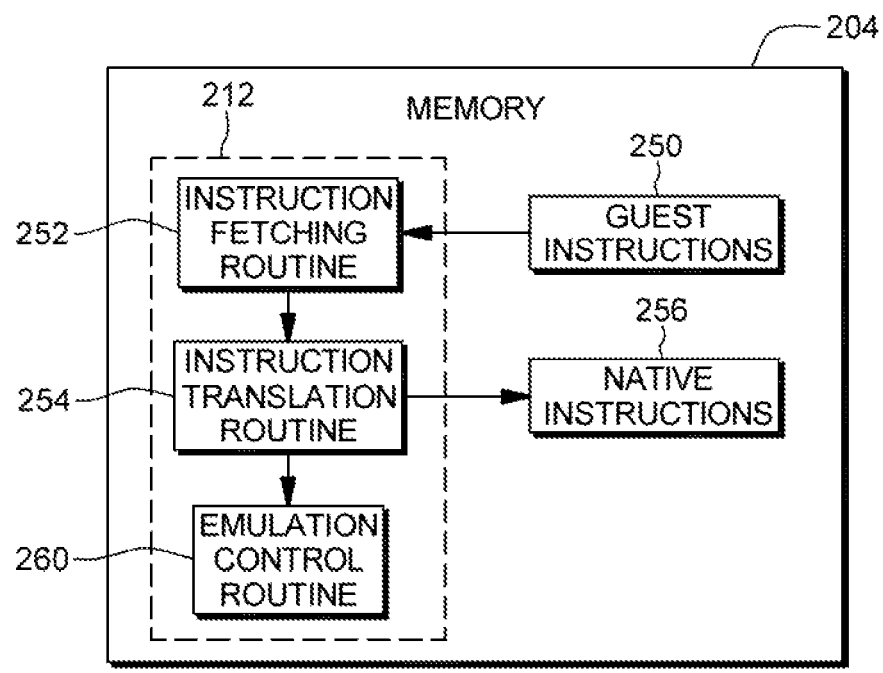
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a z/Architecture processor, but instead, are being emulated on native CPU 202, which may be, for example, an Intel processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode and/or Millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

A guest instruction 250 that is obtained, translated and executed is, for instance, one of the instructions described herein. The instruction, which is of one architecture (e.g., the z/Architecture), is fetched from memory, translated and represented as a sequence of native instructions 256 of another architecture (e.g., PowerPC, pSeries, Intel, etc.). These native instructions are then executed.

In accordance with an aspect of the present invention, a processor of one or more of the environments described herein, and/or other environments, includes a timing facility having, for instance, timing registers (e.g., hardware registers), instructions for setting and inspecting the timing registers, and an interruption mechanism for when the value in a timing register reaches a threshold value. An example of such a facility is described with reference to the z/Architecture, and its predecessors, but aspects of the invention are equally applicable to other architectures.

Figure 3A:
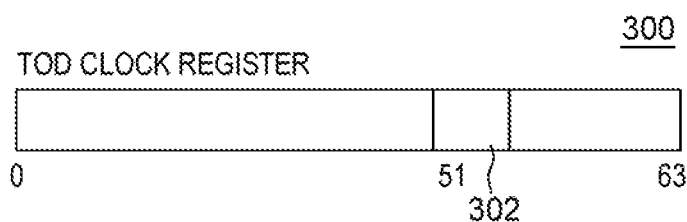
FIG. 3A depicts one example of a time-of-day (TOD) clock register, in accordance with an aspect of the present invention.

One example of a timing register is a time-of-day (TOD) clock register, an example of which is depicted in FIG. 3A. As originally defined in the S/370 architecture (circa 1970) offered by International Business Machines Corporation, the contents of a TOD clock register 300 are a 64-bit unsigned binary integer, where bit position 51 (302) is incremented every microsecond. (Note, in IBM mainframe architectures, bits are numbered in ascending order from left to right, as one example.) Given this resolution, bit 0 represents approximately 71.35 years. Thus, the duration that can be accounted for in the TOD-clock register is approximately 142.7 years; this duration is referred to as an epoch.

Figure 3B:
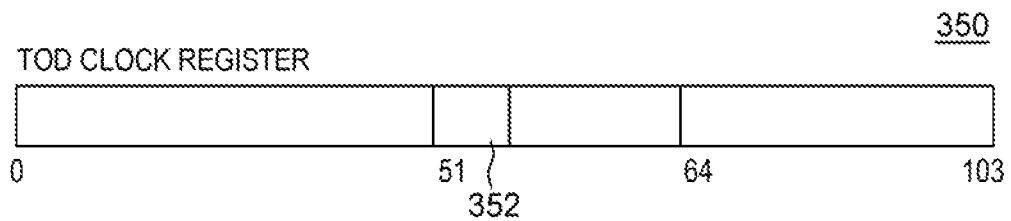
FIG. 3B depicts another example of a time-of-day clock register used in accordance with an aspect of the present invention.

In the late 1990s, an extended TOD clock facility was introduced for use, e.g., with IBM system architectures, which increased the size of the TOD clock register. As shown in FIG. 3B, a TOD clock register 350 is extended to, e.g., 104 bits. This extension allows for more precise measurements (that is, bits were added to the right of the register). Bit position 51 (352) continues to represent one microsecond; thus, the total duration of the register did not increase.

A Store Clock (STCK) instruction is defined, which allows the leftmost 64 bits of the TOD clock register to be inspected by any application program (that is, no special privileges are required to execute STCK). In one embodiment, the instruction may be a single architected machine instruction at the hardware/software interface.

Figure 4A:
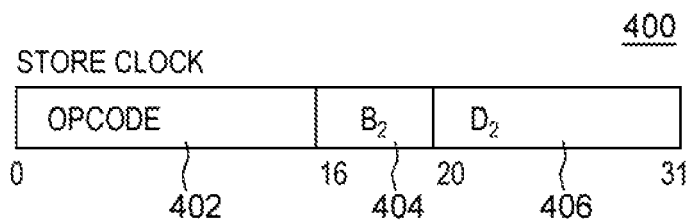
FIG. 4A depicts one example of a Store Clock instruction used in accordance with an aspect of the present invention.

One example of a Store Clock instruction is described with reference to FIG. 4A. A Store Clock instruction 400 includes an operation code (opcode) field 402 having an opcode indicating a store clock operation; a base ($B_2$) field 404; and a displacement ($D_2$) field 406. In one embodiment, the fields of the instruction are separate and independent from one another. However, in another embodiment, more than one field may be combined. Further, a subscript number associated with a field of the instruction denotes the operand to which the field applies. For instance, a field having a subscript 2 is associated with a second operand.

As one example, the contents of the register designated by $B_2$ 404 are added to the value provided by $D_2$ 406 to provide a second operand address used as described below.

Figure 4B:
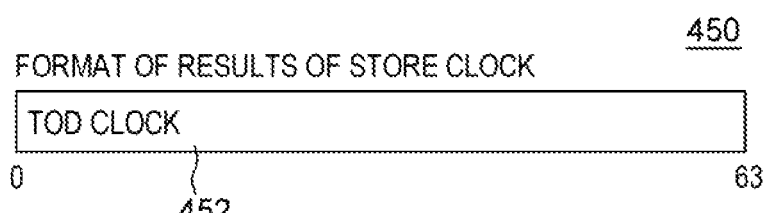
FIG. 4B depicts one example of a format of the results of the Store Clock instruction of FIG. 4A, in accordance with an aspect of the present invention.

In operation, in one example, the current value of bits 0-63 of, e.g., the 64-bit TOD clock 300 is stored in an eight-byte field designated by the second operand address, provided the clock is in the set, stopped, or not-set state, as examples. This is shown in FIG. 4B, which depicts a format 450 of the results 452 of execution of the Store Clock instruction (i.e., a 64-bit TOD clock value).

In one embodiment, when the clock is stopped, zeros are stored in positions to the right of the rightmost bit position that is incremented when the clock is running. For Store Clock, when the value of a running clock is stored, nonzero values may be stored in positions to the right of the rightmost incremented bit; this is to ensure that a unique value is stored.

As an example, zeros are stored at the operand location when, for instance, the clock is in the error state or the not-operational state.

In one example, a serialization function is performed before the value of the clock is fetched and again after the value is placed in storage.

The quality of the clock value stored by the instruction is indicated by the resultant condition code setting. Example condition codes include: 0—Clock in set state; 1—Clock in not-set state; 2—Clock in error state; and 3—Clock in stopped state or not-operational state.

Further, the following program exceptions may occur: access (store, operand 2); and transaction constraint, as examples.

In one embodiment, bit position 31 of the clock is incremented every 1.048576 seconds; hence, for timing applications involving human responses, the leftmost clock word may provide sufficient resolution.

Further, condition code 0 normally indicates that the clock has been set by the control program (e.g., operating system). Accordingly, the value may be used in elapsed-time measurements and as a valid time-of-day and calendar indication. Condition code 1 indicates that that the clock value is the elapsed time since the power for the clock was turned on. In this case, the value may be used in elapsed-time measurement, but may not be a valid time-of-day indication. Condition codes 2 and 3 mean that the value provided by Store Clock is not to be used for time measurement or indication, in one embodiment.

Moreover, in one example, condition code 3 indicates that the clock is in either the stopped state or the not-operational state. These two states can normally be distinguished because an all-zero value, as one example, is stored when the clock is in the not-operational state.

For the extended TOD clock register, a Store Clock Extended (STCKE) instruction is defined, which stores the entire 104-bit TOD clock, as well as a byte of zeros to the left of the TOD clock (leaving room for expansion).

Figure 5A:
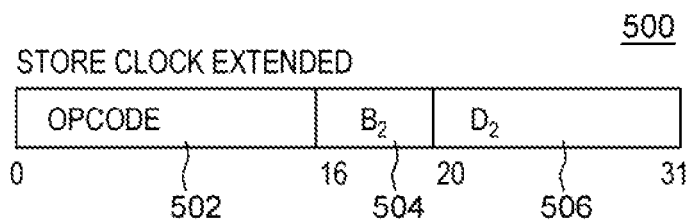
FIG. 5A depicts one example of a Store Clock Extended instruction used in accordance with an aspect of the present invention.

One example of a Store Clock Extended instruction is described with reference to FIG. 5A. In one embodiment, the instruction may be a single architected machine instruction at the hardware/software interface. As an example, a Store Clock Extended instruction 500 includes an operation code (opcode) field 502 having an opcode indicating a store clock extended operation; a base ($B_2$) field 504; and a displacement ($D_2$) field 506. In one embodiment, the fields of the instruction are separate and independent from one another. However, in another embodiment, more than one field may be combined. Further, a subscript number associated with a field of the instruction denotes the operand to which the field applies. For instance, each field having a subscript 2 is associated with a second operand.

In one example, the contents of the register designated by $B_2$ 504 are added to the value provided by $D_2$ 506 to provide a second operand address used as described below.

Figure 5B:
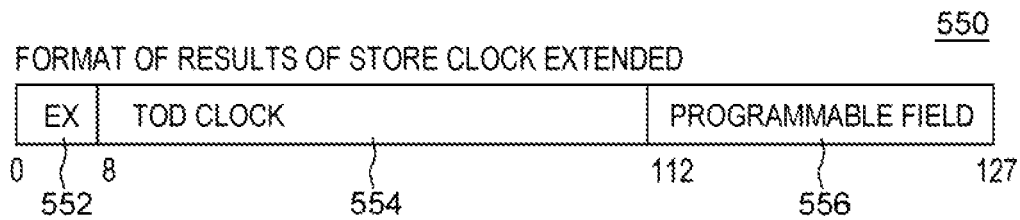
FIG. 5B depicts one example of a format of results of the Store Clock Extended instruction of FIG. 5A, in accordance with an aspect of the present invention.

In operation and with reference to FIG. 5B, the current value of bits 0-103 of the TOD clock is stored in byte positions 1-13 (554) of a sixteen byte field 550 designated by the second operand address, provided the clock is in the set, stopped, or not-set state, as examples. Zeros are stored in byte position 0 (552), which is an extended field, referred to as an epoch index (EX), further described herein. Further, contents of a TOD programmable field, bits 16-31 of a TOD programmable register, are stored in byte positions 14 and 15 (556), as examples.

In one embodiment, when the clock is stopped, zeros are stored in the clock value in positions to the right of the rightmost bit position that is incremented when the clock is running. The programmable field may also be stored.

When the value of a running clock is stored, the value in, e.g., bit positions 64-103 of the clock (e.g., bit positions 72-111 of the storage operand) is nonzero; this ensures that values stored by Store Clock Extended are unique when compared with values stored by Store Clock and extended with zeros.

As an example, zeros are stored at the operand location when the clock is in the error state or the not-operational state.

In one example, a serialization function is performed before the value of the clock is fetched and again after the value is placed in storage.

The quality of the clock value stored by the instruction is indicated by the resultant condition code setting. Example condition codes include: 0—Clock in set state; 1—Clock in not-set state; 2—Clock in error state; and 3—Clock in stopped state or not-operational state.

Further, the following program exceptions may occur: access (store, operand 2); and transaction constraint.

In one embodiment, condition code 0 normally indicates that the clock has been set by the control program. Accordingly, the value may be used in elapsed time measurements and as a valid time-of-day and calendar indication. Condition code 1 indicates that the clock value is the elapsed time since the power for the clock was turned on. In this case, the value may be used in elapsed-time measurements but is not a valid time-of-day indication. Condition codes 2 and 3 mean that the value provided by Store Clock Extended is not to be used for time measurement or indication, in one embodiment.

Operating systems using the TOD clock (whether or not extended) typically have adopted a convention where a TOD clock value of all binary zeros represents Jan. 1, 1900 at 00:00:00 a.m. This convention represents a duration referred to as a standard epoch. Given the duration of the TOD clock in the standard epoch, the clock will wrap around back to zeros on Sept. 17, 2042 at 23:53:57.370496 international atomic time (TAI).

Figure 6:
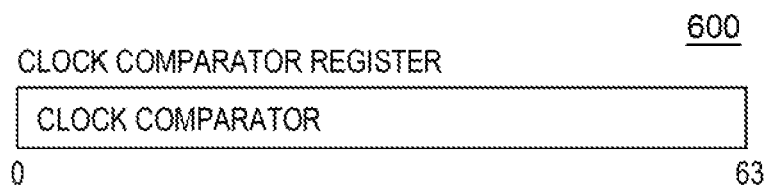
FIG. 6 depicts one example of a clock comparator register used in accordance with an aspect of the present invention.

In addition to the TOD clock, another register provided by the timing facility and used in one or more aspects of the present invention is a clock comparator. The clock comparator provides a means of causing an external interruption to be recognized by the processor (and may occur) whenever the value of the TOD clock exceeds a value specified by the program. In one example, as depicted in FIG. 6, a clock comparator register 600 has, e.g., 64 bits. Each CPU in a configuration, in one example, has a clock comparator register, the format of which is the same as bits 0-63 of the TOD clock. The clock comparator can be set by a privileged instruction referred to as Set Clock Comparator instruction, and inspected by a privileged Store Clock Comparator instruction, as examples.

In one aspect, when a value of a portion of the TOD clock to be compared is greater than a value of the clock comparator register, a request for a clock comparator interruption may exist (although certain exceptions apply if the clock is in the error or not-running state). In one example, this comparison uses unsigned binary arithmetic, and may not compare all bits of the clock comparator register; however, at least bits 0-47 are compared, in one embodiment. (In other embodiments, more or fewer bits may be compared.) Whether or not a pending clock comparator interruption actually occurs depends, for instance, on whether the CPU is enabled for clock comparator external interrupts. Enablement is determined by two controls, in one example:

1. External interrupts (also referred to as interrupts) are enabled by a selected bit in a control register, such as bit 7 in the program status word (PSW). The program status word is a control register that performs the functions of a status register and a program counter. It contains information used for proper program execution, including, but not limited to, a condition code, an instruction address, and other information. Bit 7 indicates the enablement of external interrupts. When the bit is set, e.g., to one, external interrupts are enabled.
2. If external interrupts are enabled, a bit in a second control in a control register, such as control register 0, determines whether the clock comparator subclass of external interrupts is enabled.

A pending clock comparator interrupt may be withdrawn by setting the clock comparator register to a value that is equal to or greater than the value of the TOD clock.

Currently, the Store Clock Extended (STCKE) instruction stores zeros in the leftmost eight bit positions (EX field 552 of FIG. 5B). Using the standard epoch beginning on Jan. 1, 1900, the TOD clock will overflow on Sept. 17, 2042. When such an overflow occurs, a carry will be propagated to the left. That is, epoch index (EX) field 552 will be considered to be a logical extension of the TOD clock. When the EX and TOD clock fields are concatenated in this way, it provides for an extended epoch of approximately 35,000 years.

However, the size of the clock comparator register has not increased. This allows simpler circuitry, but presents a problem of how to compare the TOD clock with the clock comparator value. With the enhancements described above, the TOD clock can accommodate an extended epoch that is 256 times larger than a single epoch; however, the clock comparator is limited to a single epoch.

For example, consider the scenario where the current TOD clock is near to overflowing, e.g., it contains FFFFFFFF,00000000 hex. Since bit position 51 represents one microsecond, bit position 31 represents 1.048,576 seconds. Thus, the TOD clock will overflow in just over one second. If the program wishes to set a clock comparator to occur in exactly 2.097,152 seconds, it would add a value of 00000002,00000000 hex to the current TOD clock. The result of the addition is 1,00000001,00000000 hex, but because the clock comparator, in one embodiment, only accommodates a 64-bit value (whose bit positions correspond to those of the TOD clock), the result of the carry is lost, and the clock comparator is set to 00000001,00000000 hex. According to the rules of unsigned binary arithmetic, the clock comparator is now less than the TOD clock, so a clock comparator interrupt would immediately become pending, even though the expected event does not occur for two seconds.

Therefore, in accordance with an aspect of the present invention, a capability is provided of using a 64-bit clock comparator with an extended-format TOD clock regardless of whether the TOD clock overflows (i.e., regardless if the epoch index becomes a logical extension of the TOD clock). In one aspect, a multiple-epoch facility (MEF) is provided that defines a clock comparator sign control, allowing comparisons of the clock comparator to be either signed or unsigned. When properly used by the operating system, the clock comparator sign control allows a 64-bit clock comparator to correctly indicate clock comparator interrupts, regardless of whether the corresponding bits of the TOD clock have overflowed. In one embodiment, the clock comparator sign control is available when the multiple-epoch facility is installed in the configuration. (Note, MEF provides the epoch index into which the TOD clock overflows when it reaches its maximum value; however, the clock comparator sign control operates independently from the epoch index.)

Figure 7:
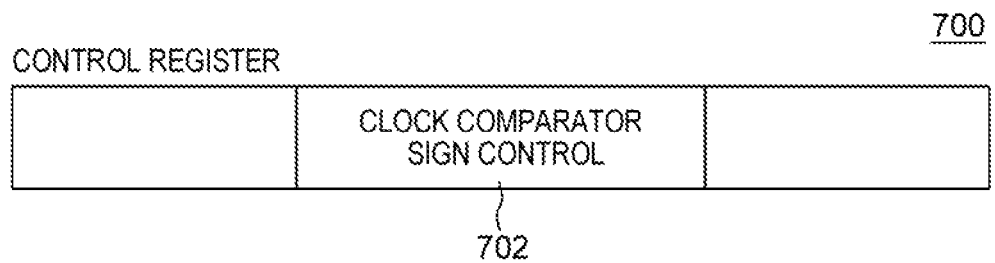
FIG. 7 depicts one example of a control register used in accordance with an aspect of the present invention.

In one embodiment, the clock comparator sign control is implemented as a bit in a control register. For instance, as depicted in FIG. 7, a control register 700, such as control register 0, includes a clock comparator sign control 702. In one particular embodiment, clock comparator sign control 702 is bit 10 of control register 0, but other possibilities exist. The meaning of the clock comparator sign control is as follows, in one example.

0=comparison follows the rules of unsigned binary arithmetic;
1=comparison follows the rules of signed binary arithmetic.

Since, in one example, bit 10 of control register zero was previously unassigned and reset to a zero value by default, using a value of zero to provide unsigned comparison ensures compatibility with older operating systems that are unaware of MEF, even if they are operating on a machine that supports MEF.

To further explain the use of the sign control, the example cited above is repeated, but assuming that signed comparison is being performed.

TOD clock=FFFFFFFF,00000000 hex
Clock comp=00000001,00000000 hex

Using signed arithmetic, bit 0 of each value is the sign bit. Thus, the TOD clock initially contains a negative value which is less than the positive value of the clock comparator. Assume that the TOD clock has advanced by a sufficient amount to exceed the clock comparator (e.g., to a value of 01,00000001,00000123). Here, the leftmost byte is the epoch-index, and does not participate in the comparison. So, the TOD clock value (00000001,00000123) is now greater than the clock comparator (00000001,00000000), thus a clock comparator interrupt becomes pending.

In one embodiment, a program can set the clock comparator value either to never recognize a clock comparator interruption or to immediately recognize a clock comparator interruption, as follows:

When the clock comparator sign control is zero:
Setting the clock comparator to zeros causes the clock comparator interruption to immediately become pending.
Setting the clock comparator to ones prevents a clock comparator interruption condition from being recognized.

When the multiple-epoch facility is installed, and the clock comparator sign control is one:
Setting the clock comparator to the maximum negative value (80000000,00000000 hex) causes the clock comparator interruption to immediately become pending.
Setting the clock comparator to the maximum positive value (7FFFFFFF,FFFFFFFF hex) prevents a clock comparator interruption condition from being recognized.

In a further aspect, when the multiple-epoch facility is installed in the configuration, the clock comparator sign control provides the means by which a control program can specify what constitutes a discontinuity in a compared portion of the TOD clock for the purposes of clock comparator checking: either transitioning from the maximum unsigned TOD clock value to zero, or transitioning from the maximum positive signed TOD clock value to the maximum negative value. That is, when unsigned comparison is used, a discontinuity in the compared portion of the time-of-day clock occurs when the compared bits—treated as an unsigned value—increase such that the value wraps around from a maximum unsigned value to zero. When signed comparison is used, a discontinuity in the compared portion of the time-of-day clock occurs when the compared bits—treated as a signed value—increase such that the value wraps around from a maximum positive value to a maximum negative value.

Assuming that a configuration is reinitialized at least once during an epoch, it is recommended, e.g., that the clock comparator sign control be set to the contents of bit position 0 of the TOD clock when the program is initialized. This ensures that clock comparator checking observes no discontinuity in the TOD clock as long as, e.g., the clock comparator is not set to more than half of an epoch into the future, which is not significant to a typical usage of the clock comparator, where clock comparator values are normally set to indicate short intervals, for example, less than one second.

To ensure consistent results when altering the clock comparator sign control, in one embodiment, the program is to (a) disable clock comparator interruptions, (b) set the clock comparator sign control, (c) issue the Set Clock Comparator instruction to set a new comparator value, and then (d) enable for clock comparator interruptions, as appropriate.

Once set, the clock comparator sign control is intended to remain unchanged until the next initial CPU reset (such as at initial program loading (IPL)). Dynamic changing of the clock comparator sign control may result in false recognition of a clock comparator condition that is withdrawn as a result of the changed control or in the delayed recognition of a clock comparator condition that becomes pending as a result of the changed control.

Figure 8:
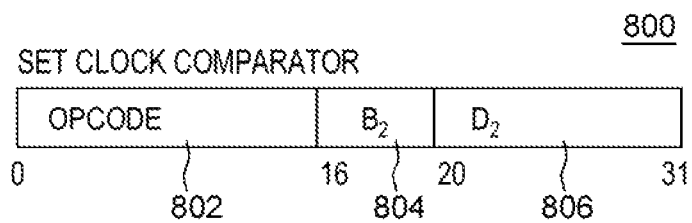
FIG. 8 depicts one example of a Set Clock Comparator instruction, in accordance with an aspect of the present invention.

As indicated above, the clock comparator may be set using a Set Clock Comparator instruction. Further details regarding such an instruction are described with reference to FIG. 8. In one embodiment, the instruction may be a single architected machine instruction at the hardware/software interface.

In one example, a Set Clock Comparator instruction 800 includes, for instance, an operation code (opcode) field 802 having an opcode specifying a set clock comparator operation; a base ($B_2$) field 804; and a displacement ($D_2$) field 806. In one embodiment, the fields of the instruction are separate and independent from one another. However, in another embodiment, more than one field may be combined. Further, a subscript number associated with a field of the instruction denotes the operand to which the field applies. For instance, the fields having a subscript 2 are associated with a second operand.

In one example, the contents of the register designated by $B_2$ 804 are added to the value provided by $D_2$ 806 to provide a second operand address used as described below.

In operation, in one example, the current value of the clock comparator is replaced by the contents of the doubleword designated by the second operand address.

As one example, those bits of the operand are set in the clock comparator that correspond to the bit positions to be compared with the TOD clock; the contents of the remaining rightmost bit positions of the operand are ignored and are not preserved in the clock comparator, in one embodiment.

Further, in one embodiment, the operand is to be designated on a doubleword boundary; otherwise, a specification exception is recognized.

Moreover, in one example, the operation is suppressed on all addressing and protection exceptions. Additionally, the following program exceptions may occur: access (fetch, operand 2); privileged operation; specification; and transaction constraint.

In addition to the above, the clock comparator may be inspected by a Store Clock Comparator instruction. In one embodiment, the instruction may be a single architected machine instruction at the hardware/software interface.

Figure 9:
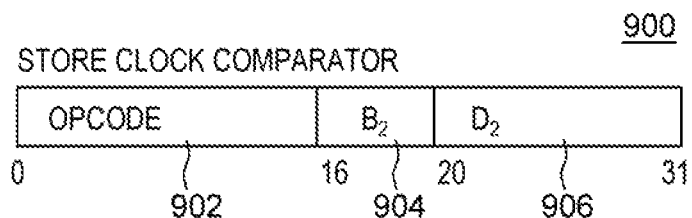
FIG. 9 depicts one example of a Store Clock Comparator instruction, in accordance with an aspect of the present invention.

One example of a Store Clock Comparator instruction is described with reference to FIG. 9. In one example, a Store Clock Comparator instruction 900 includes, for instance, an operation code (opcode) field 902 having an opcode specifying a store clock comparator operation; a base ($B_2$) field 904; and a displacement ($D_2$) field 906. In one embodiment, the fields of the instruction are separate and independent from one another. However, in another embodiment, more than one field may be combined. Further, a subscript number associated with a field of the instruction denotes the operand to which the field applies. For instance, the fields having a subscript 2 are associated with a second operand.

In one example, the contents of the register designated by $B_2$ 904 are added to the value provided by $D_2$ 906 to provide a second operand address used as described below.

In operation, in one example, the current value of the clock comparator is stored at the doubleword location designated by the second operand address.

As one example, zeros are provided for the rightmost bit positions of the clock comparator that are not compared with the TOD clock.

In one embodiment, the operand is to be designated on a doubleword boundary; otherwise, a specification exception is recognized. Further, in one example, the following program exceptions may occur, for example: access (store, operand 2); privileged operation; specification; and transaction constraint.

Described herein is a facility that defines a clock comparator sign control that allows comparisons of the clock comparator to be signed or unsigned. This facilitates processing within a computing environment by providing correct results even in a TOD overflow condition. One or more aspects of the present invention are inextricably tied to a computer system, improving processing within the system.

Figure 10:
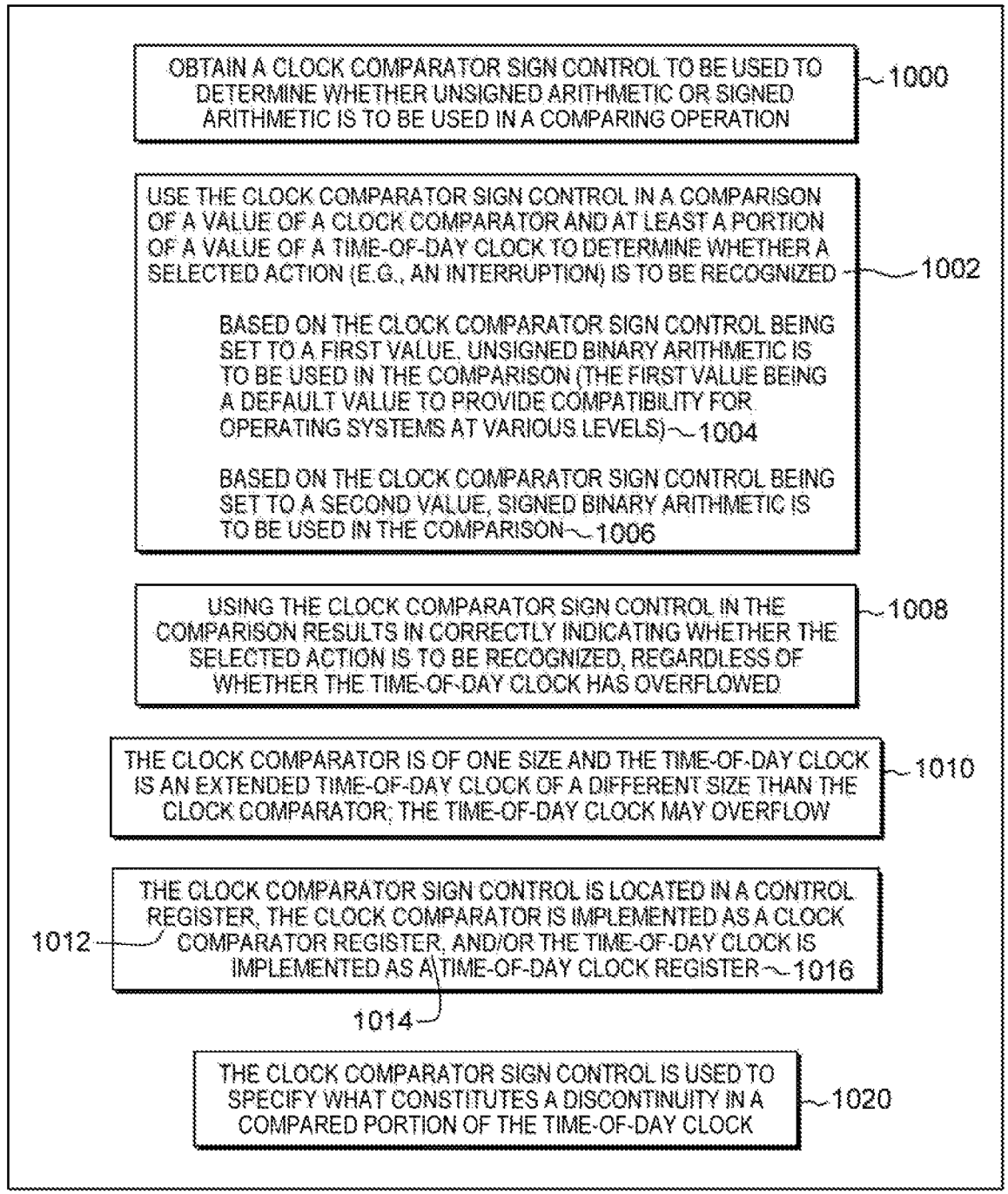
FIG. 10 depicts one embodiment of processing associated with a clock comparator sign control, in accordance with an aspect of the present invention.

Further details associated with the clock comparison sign control are described with reference to FIG. 10. In one example, a clock comparator sign control to be used to determine whether unsigned arithmetic or signed arithmetic is to be used in a comparing operation is obtained by, e.g., a processor (1000). This is accomplished by e.g., accessing the sign control (e.g., bit 10) of the control register (e.g., control register 0). The clock comparator sign control is then used in a comparison of a value of a clock comparator and at least a portion of a value of a time-of-day (TOD) clock to determine whether a selected action (e.g., an interruption) is to be recognized (1002). For instance, a value of the clock comparator is obtained by using, e.g., the Store Clock Comparator instruction, and a value of the TOD clock is obtained by using, e.g., the Store Clock Extended instruction. The value of the clock comparator and the at least a portion of the value of the TOD clock are compared using either unsigned arithmetic or signed arithmetic depending on the value of the clock comparator sign control. If, for instance, the comparison indicates that the at least a portion of the value of the TOD clock is greater than the value of the clock comparator, the selected action is to be recognized.

In one embodiment, based on the clock comparator sign control being set to a first value, unsigned binary arithmetic is to be used in the comparison (the first value being a default value to provide compatibility for operating systems at various levels) (1004); and based on the clock comparator sign control being set to a second value, signed binary arithmetic is to be used in the comparison (1006).

The using the clock comparator sign control in the comparison results in correctly indicating whether the selected action is to be recognized, regardless of whether the time-of-day clock has overflowed (1008).

In one example, the clock comparator is of one size and the time-of-day clock is an extended time-of-day clock of a different size than the clock comparator, and the time-of-day clock may overflow (1010).

Further, as examples, the clock comparator sign control is located in a control register (1012), the clock comparator is implemented as a clock comparator register (1014), and/or the time-of-day clock is implemented as a time-of-day clock register (1016).

Additionally, in one example, the clock comparator sign control is further used to specify what constitutes a discontinuity in a compared portion of the time-of-day clock (1020).

Many variations are possible.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Additionally, the computer system and/or environment may include more, fewer and/or different components. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing in a computing environment, said computer program product comprising:
at least one computer readable storage medium readable by at least one processing circuit and storing instructions to perform a method comprising:
obtaining a clock comparator sign control to be used to determine whether unsigned arithmetic or signed arithmetic is to be used in a comparing operation;
using the clock comparator sign control in a comparison of a value of a clock comparator and at least a portion of a value of a time-of-day clock to determine whether a selected action is to be recognized, wherein based on the clock comparator sign control being set to a first value, unsigned arithmetic is to be used in the comparison, the first value being a default value to provide compatibility for operating systems at various levels; and
performing, by a processor, based on the comparison, the selected action.

2. The computer program product of claim 1, wherein the using the clock comparator sign control in the comparison results in correctly indicating whether the selected action is to be recognized, regardless of whether the time-of-day clock has overflowed.

3. The computer program product of claim 1, wherein based on the clock comparator sign control being set to the first value, unsigned binary arithmetic is to be used in the comparison, the first value being the default value to provide compatibility for operating systems at various levels.

4. The computer program product of claim 1, wherein based on the clock comparator sign control being set to a second value, signed binary arithmetic is to be used in the comparison.

5. The computer program product of claim 1, wherein the selected action is an interruption of processing within the computing environment.

6. The computer program product of claim 1, wherein the clock comparator is one size and the time-of-day clock is an extended time-of-day clock of a different size than the clock comparator, and wherein the time-of-day clock may overflow.

7. The computer program product of claim 1, wherein the clock comparator sign control is located in a control register.

8. The computer program product of claim 1, wherein the clock comparator is implemented as a clock comparator register and the time-of-day clock is implemented as a time-of-day clock register.

9. The computer program product of claim 1, wherein the method further comprises using the clock comparator sign control to specify what constitutes a discontinuity in a compared portion of the time-of-day clock.

10. A computer system for facilitating processing in a computing environment, said computer system comprising:
 a memory; and
 a processor in communication with the memory, wherein the computer system is configured to perform a method, said method comprising:
  obtaining a clock comparator sign control to be used to determine whether unsigned arithmetic or signed arithmetic is to be used in a comparing operation;
  using the clock comparator sign control in a comparison of a value of a clock comparator and at least a portion of a value of a time-of-day clock to determine whether a selected action is to be recognized, wherein based on the clock comparator sign control being set to a first value, unsigned arithmetic is to be used in the comparison, the first value being a default value to provide compatibility for operating systems at various levels; and
  performing, by a processor, based on the comparison, the selected action.

11. The computer system of claim 10, wherein the using the clock comparator sign control in the comparison results in correctly indicating whether the selected action is to be recognized, regardless of whether the time-of-day clock has overflowed.

12. The computer system of claim 10, wherein based on the clock comparator sign control being set to the first value, unsigned binary arithmetic is to be used in the comparison, the first value being the default value to provide compatibility for operating systems at various levels.

13. The computer system of claim 10, wherein based on the clock comparator sign control being set to a second value, signed binary arithmetic is to be used in the comparison.

14. The computer system of claim 10, wherein the selected action is an interruption of processing within the computing environment.

15. The computer system of claim 10, wherein the clock comparator is one size and the time-of-day clock is an extended time-of-day clock of a different size than the clock comparator, and wherein the time-of-day clock may overflow.

16. A computer-implemented method of facilitating processing in a computing environment, said computer-implemented method comprising:
 obtaining, by a processor, a clock comparator sign control to be used to determine whether unsigned arithmetic or signed arithmetic is to be used in a comparing operation;
 using the clock comparator sign control in a comparison of a value of a clock comparator and at least a portion of a value of a time-of-day clock to determine whether a selected action is to be recognized, wherein based on the clock comparator sign control being set to a first value, unsigned arithmetic is to be used in the comparison, the first value being a default value to provide compatibility for operating systems at various levels; and
 performing, by a processor, based on the comparison, the selected action.

17. The computer-implemented method of claim 16, wherein the using the clock comparator sign control in the comparison results in correctly indicating whether the selected action is to be recognized, regardless of whether the time-of-day clock has overflowed.

18. The computer-implemented method of claim 16, wherein based on the clock comparator sign control being set to the first value, unsigned binary arithmetic is to be used in the comparison, the first value being the default value to provide compatibility for operating systems at various levels.

19. The computer-implemented method of claim 16, wherein based on the clock comparator sign control being set to a second value, signed binary arithmetic is to be used in the comparison.

20. The computer-implemented method of claim 16, wherein the clock comparator is one size and the time-of-day clock is an extended time-of-day clock of a different size than the clock comparator, and wherein the time-of-day clock may overflow.

* * * * *